United States Patent [19]
Rub et al.

[11] Patent Number: 6,111,834
[45] Date of Patent: Aug. 29, 2000

[54] DATA STORAGE SYSTEM HAVING EFFICIENT BLOCK CODE IMPLEMENTATION

[75] Inventors: Bernardo Rub, Edina; Kinhing P. Tsang, Plymouth, both of Minn.

[73] Assignee: Seagate Technology, Inc., Scotts Valley, Calif.

[21] Appl. No.: 09/020,874

[22] Filed: Feb. 9, 1998

Related U.S. Application Data

[60] Provisional application No. 60/054,739, Aug. 11, 1997.

[51] Int. Cl.[7] .................................................. G11B 7/00
[52] U.S. Cl. .............................................. 369/59; 369/48
[58] Field of Search .................................. 369/59, 47, 48, 369/49, 50, 54, 58, 32, 60; 360/48, 51, 53, 39

[56] References Cited

U.S. PATENT DOCUMENTS

| | | | |
|---|---|---|---|
| 4,573,034 | 2/1986 | Immink | 340/347 |
| 4,802,169 | 1/1989 | Suzuki et al. | 371/38 |
| 5,172,380 | 12/1992 | Odaka | 371/37 |
| 5,237,574 | 8/1993 | Weng | 371/40.1 |
| 5,331,320 | 7/1994 | Cideciyan et al. | 341/56 |
| 5,381,424 | 1/1995 | Tsang | 371/40.1 |
| 5,422,760 | 6/1995 | Abbott et al. | 360/46 |
| 5,535,187 | 7/1996 | Melas et al. | 369/59 |
| 5,600,373 | 2/1997 | Chui et al. | 348/397 |
| 5,627,843 | 5/1997 | Deng et al. | 371/37.1 |
| 5,640,286 | 6/1997 | Acosta | 360/48 |
| 5,859,826 | 1/1999 | Ueno et al. | 369/59 |

*Primary Examiner*—Muhammad Edun
*Attorney, Agent, or Firm*—Westman, Champlin & Kelly, P.A.

[57] ABSTRACT

A storage device includes a storage medium, write element and a data input. A first encoder provides an encoded data output as a function of a first portion of the data input. The first encoder also provides a state output. A second encoder provides a second encoded data output as a function of the plurality of data input and as a function of the state output. The first and second data outputs are coupled to the write element for writing information onto the storage medium. In addition, a similar technique is used for a block decoder.

24 Claims, 3 Drawing Sheets

DATA STORAGE SYSTEM HAVING EFFICIENT BLOCK CODE IMPLEMENTATION

CROSS-REFERENCE TO RELATED APPLICATION

The present invention claims priority to Provisional Application Ser. No. 60/054,739, filed Aug. 11, 1997 and entitled EFFICIENT BLOCK CODE IMPLEMENTATION.

BACKGROUND OF THE INVENTION

The present invention relates to disc drives. More particularly, the present invention relates to block codes used in data channels of disc drives.

A typical disc drive includes one or more magnetic discs mounted for rotation on a hub or spindle. A typical disc drive also includes a transducer supported by an air bearing which flies above each magnetic disc. The transducer and the air bearing are collectively referred to as a data head. A drive controller is conventionally used for controlling the disc drive based on commands received from a host system. The drive controller controls the disc drive to retrieve information from the magnetic discs and to store information on the magnetic discs.

An electromechanical actuator operates within a negative feedback, closed-loop servo system. The actuator moves the data head radially over the disc surface for track seek operations and holds the transducer directly over a track on the disc surface for track following operations.

Information is typically encoded and stored in concentric tracks on the surface of magnetic discs by providing a write signal to the data head to encode flux reversals on the surface of the magnetic disc representing the data to be stored. In retrieving data from the disc, the drive controller controls the electromechanical actuator so that the data head flies above the magnetic disc, sensing the flux reversals on the magnetic disc, and generating a read signal based on those flux reversals. The read signal is typically conditioned and then decoded by a read channel or the drive controller to recover data represented by flux reversals stored on the magnetic disc, and consequently represented in the read signal provided by the data head.

A communication channel represented by such a disc drive includes an encoder which encodes user input data, the data head, the medium (e.g., the magnetic or optical disc), preconditioning logic (such as amplifiers, filters, a gain loop, a sampler, a timing loop, and clock generation), a data detector, and a decoder for decoding the detected data to provide an output indicative of estimated user data.

Generally, there are two types of encoding techniques used in communication channels. These are block encoding and convolution encoding techniques. Block coding techniques are typically used in disc drives and are well suited for correcting burst errors and imposing certain properties (constraints) in the encoded data which are useful in subsequent data processing. One type of block code is a Run-Length-Limited (RLL) code which limits the number of flux transitions which occur in a sequence. Advanced data storage systems frequently use error-correction encoding concatenated with RLL encoding.

A block encoder and decoder having a rate of m/n for encoding data in blocks can be implemented using two tables which are related to the size of the block. The encoder is formed by a table having $2^m \times n$ data entries and the decoder may be formed by a table having $2^n \times m$ data entries. However, for large values of m and n, these tables become prohibitively large and cannot be practically implemented in a disc drive storage system.

One approach which is used to implement block encoding in systems having relatively large values of m and n is to only encode a portion of each data word. The remainder of the data word is left unencoded. For example, a common technique to implement a 16/17 rate code is to leave the first eight bits unencoded and encode the remaining eight bits into nine bits. In this manner, the complexity of the encoder is comparable to that of a 8/9 rate encoder. The disadvantage is that eight bits are passed through unencoded and cannot be used to impose code constraints, such as run length limits.

The present invention provides a solution to this and other problems, and offers advantages over the prior art.

SUMMARY OF THE INVENTION

The present invention relates to storage systems having block encoders which solve the above-mentioned problem.

In accordance with one embodiment of the invention, a storage device includes a storage medium and a write element positioned adjacent the storage medium to write information to the storage medium in response to a write signal input. A data input is provided which has a plurality of data input bits. A first encoder is coupled to the data input and includes a first encoded data output as a function of a first portion of the plurality of data input bits along with a state output. The first encoded data output is coupled to the write signal input of the write element. A second encoder is coupled to the data input and includes a second encoded data output as a function of a second portion of the plurality of data input bits and the state output. The second encoded data output is coupled to the write signal input of the write element.

In another embodiment, a storage device includes a storage medium and a read element positioned adjacent the storage medium to read information to the storage medium and provide a read signal output. A first decoder is coupled to the read element and includes a first decoded data output as a function of a first portion of the read signal output and a state output. The first decoded data output is coupled to a system output. A second decoder is coupled to the read element and including a second decoded data output as a function of the read signal output and as a function of the state output. The second decoded data output is coupled to the system output.

These and various other features as well as advantages which characterize the present invention will be apparent upon reading of the following detailed description and review of the associate drawings.

DETAILED DESCRIPTION OF THE PREFERRED EMBODIMENTS

Figure 1:
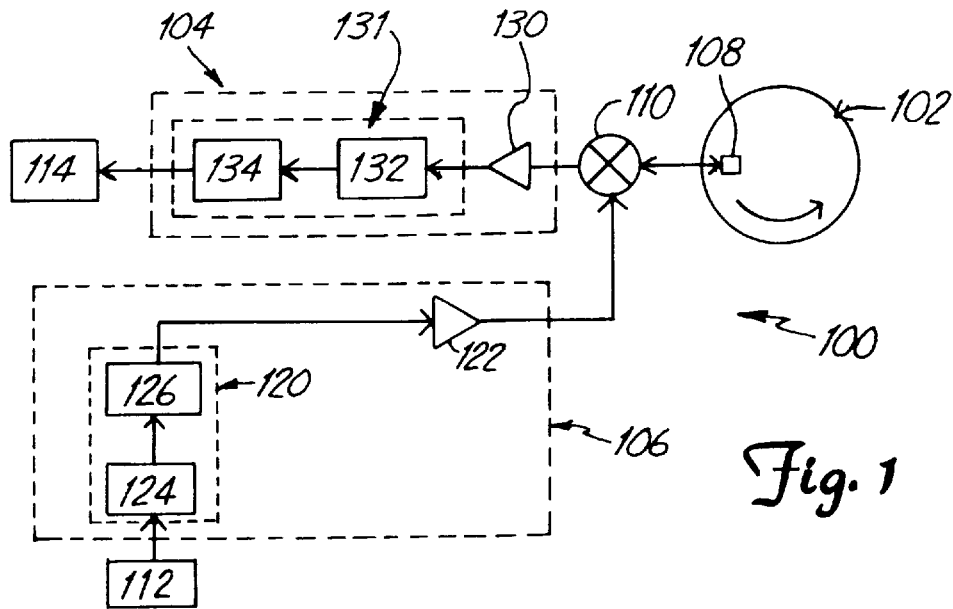
FIG. 1 is a simplified block diagram of a data storage system in accordance with the present invention.

Referring now to FIG. 1, a simplified block diagram of a disc drive storage system 100 in accordance with the present invention is shown. System 100 may be any type of storage device including magnetic, optical, magneto optical, etc. System 100 includes disc 102, read circuitry 104 and write circuitry 106 coupled to a transducing head 108 through switch 110. Transducing head 108 is positioned over a data surface of disc 102 and in one preferred embodiment comprises a head for reading and writing magnetically encoded information. Information received from input circuitry 112 is written onto disc 102 by write circuitry 106 which applies a write signal to transducing element 108. During readback, a signal is generated by transducing head 108 which is representative of a data signal stored on disc 102 and is provided to read circuitry 104. Read circuitry 104 decodes data carried in the data signal and provides an output through output circuitry 114.

Using known data encoding techniques, it is possible to record information on disc 102 such that errors may be detected, and in some instances corrected, during readback of the stored information. Write circuitry 106 includes encoding section 120 and amplification circuitry 122. Encoding section 120 is shown generally with a block encoder 124 and a PR4 precoder 126. Read circuitry 104 includes amplifier 130 and decoding section 131. Decoding section 131 generally includes a Partial Response Maximum Likelihood (PRML) detection 132 and a block decoder 134 in accordance with the present invention. Block encoder 124 and block decoder 134 are in accordance with the present invention and are described below in greater detail. Class 4 Partial Response (PR4) precoder 126 provides encoding to the data which is useful for PRML channels.

Block encoder 124 and block decoder 134 operate in accordance with the present invention and efficiently encodes and decodes all bits of long data words without the large look-up tables required by the prior art. In accordance with the present invention, block encoder 124 and block decoder 134 partition the data word to reduce the complexity of the encoding and decoding. The technique is useful for implementing higher rate codes such as codes with a 16/17 rate or greater, and imposing properties on the code that are useful when followed by a PR4 precoder 126 for use with PRML channels.

In implementing a block code in accordance with the present invention, various code constraints can be imposed. In one preferred embodiment, code constraints are imposed which have the following properties:

g: global Run-Length-Limited (RLL) constrains. Maximum run of 0's anywhere in the encoded sequence.

I: interleave RLL constraint. Maximum run of 0's per interleave.

Maximum error propagation: Number of bytes in error as a result of a single minimum distance error event.

Minimum code energy: Number of one's in the encoded pattern. This is an indication of the amount of timing information on each codeword. With the preferred embodiment, the following constraints may be obtained:

TABLE 1

| g | i | Maximum Error Propagation (Bytes) | Minimum Code Energy |
|---|---|---|---|
| 4 | 7 | 3 | 4 |
| 5 | 6 | 3 | 6 |
| 6 | 6 | 3 | 7 |

Figure 2:
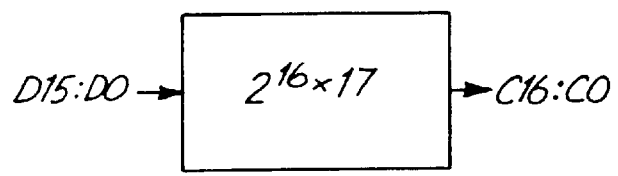
FIG. 2 is a diagram of a prior art block encoder.
Figure 3:
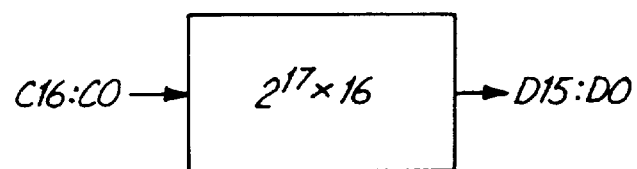
FIG. 3 is a diagram of a prior art block decoder.

FIGS. 2 and 3 are block diagrams of prior art 16/17 rate block encoder and decoder, respectively. The 16/17 rate block encoder of FIG. 2 receives 16 data bits of input (D0–D15) and provides a 17 code bit output (bits C0–C16) using a $2^{16} \times 17$ look-up table. Similarly, as shown in FIG. 3, 17 data bits (C0–C16) are decoded using a $2^{17} \times 16$ look-up table into 16 data bits (D0–D15). This prior art approach provides the desired code output, however, it requires relatively large look-up tables which are inefficient and may be impractical in most systems.

Figure 4:
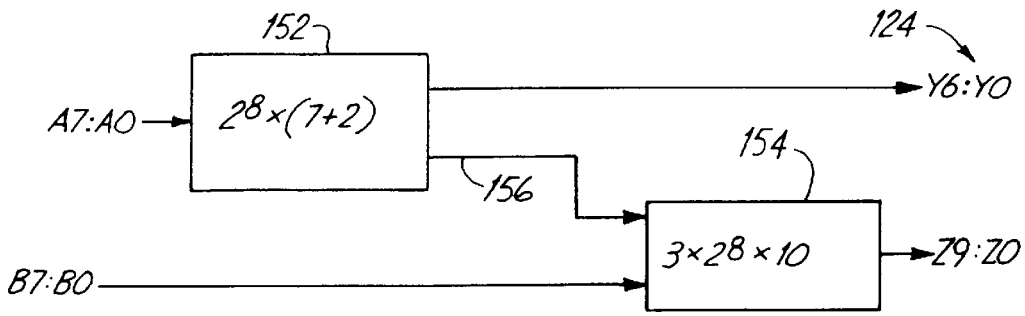
FIG. 4 is a diagram of a block encoder in accordance with one embodiment of the present invention.

FIG. 4 is a diagram of a block encoder 124 in accordance with one embodiment of the present invention. Block encoder 124 includes a first (Part A) encoder 152 and a second (Part B) encoder 154. The preferred embodiment partitions the input data into two parts. Data bits A0–A7 (i.e., 8 bits) which correspond to bits D8–D15 of FIG. 2 are provided to encoder 152. Data bits B0–B7 (i.e., 8 bits) which correspond to bits D0–D7 of FIG. 2 are provided to encoder 154. Encoder 152 provides a first encoded data output having bits Y0–Y6 which correspond to bits C0–C6 of FIG. 2. Similarly, encoder 154 provides an encoded data output signal having bits Z0–Z9 which correspond to bits C7–C16 of FIG. 2.

Encoder 152 provides a state number output 156 to encoder 154. Encoder 154 includes a table having three groups of 10 bit codewords each group is assigned a state number (0, 1 or 2). There are 256 codewords in each 10 bit group. Thus, there are only 3×256=768 codewords out of 1024 possible codewords which are used by encoder 154. Preferably, these unused codewords are chosen to provide preferred code properties in conjunction with encoder 152.

Each entry in the table of encoder 152 is a 7 bit codeword along with a state number of two bits which is communicated to encoder 154. There are 127 possible non-zero values for the codeword of encoder 152. Thus, there are 3×127=381 possible combinations of codewords for encoder 152 and the corresponding state number. However, as only 256 entries are required for encoder 152, some Part A codewords in encoder 152 may be eliminated and/or some Part B state and Part A codewords may be disallowed.

Figure 5:
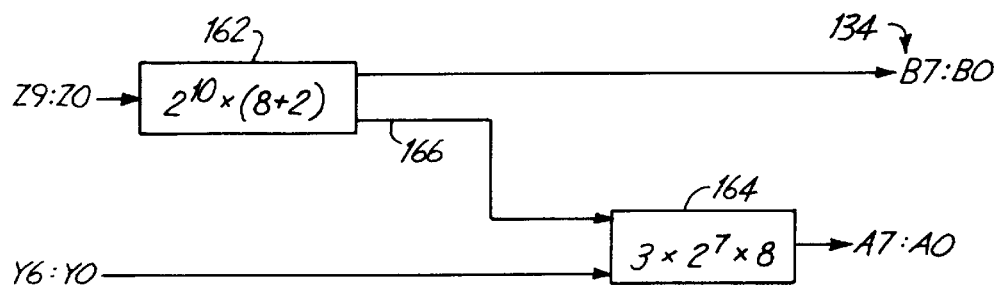
FIG. 5 is a diagram of a block decoder in accordance with one embodiment of the present invention.

FIG. 5 is a diagram of block decoder 134. Decoder 134 includes a first (Part B) decoder 162 and a second (Part A) decoder 164. Decoder 162 receives 10 data bits (Z0–Z9) and provides 8 decoded data bits (B0–B7) and a state number output 166. Decoder 164 receives 7 data bits (Y0–Y6) along with the state number from decoder 162 and provides an 8 data bit output (A0–A7). For the examples shown, decoder 162 is a table of $2^{10} \times (8+2)$ (8 bits of data and 2 bits of state) and decoder 164 is a table of $3 \times 2^7 \times 8$.

One important property of a preferred decoder implementation is that an error in bits Y0–Y6 will only affect a single byte (decoded bits A0–A7) of the decoded data. This is preferred because it limits the error propagation of the decoder to a maximum of 3 bytes. Error events that are 8 bits or less in length are guaranteed to affect only 3 bytes of data. Longer error events, for example one that starts in part B of one codeword and ends in part B of the next codeword, can be restricted by eliminating some part A patterns. For an embodiment using EPR4, it is sufficient to eliminate all part A patterns that are all zero in either interleave.

It is also preferable to reduce the probability of propagating errors to 2 bytes by making the state number determination independent of any bits which are located near the end of the codeword. For example, if the state number can be uniquely determined by bits Z5–Z9, then any errors in bits Z0–Z4 will not affect the decoding of part A. In this way, error events of 6 bits or less can only corrupt 2 bytes and error events of 13 bits or less are guaranteed to only affect 3 bytes of data.

It is also possible to use the sequence of codewords included in the encoding table of encoder 152 to ensure a minimum code energy for each word. Further, the grouping of the part B codewords should also take into account to ensure a minimum code energy. It is possible to have a minimum code energy state as given in Table 2:

TABLE 2

| State | Part B Minimum Code Energy |
|---|---|
| 0 | 3 |
| 1 | 4 |
| 2 | 5 |

The sequence of the part A codewords and the part B states can then be constrained to guarantee that the combined code energy (the sum of the code energy of part A and part B) is also 7 or greater, as shown below in Table 3:

TABLE 3

| Part A Code Energy | Valid State Transitions |
|---|---|
| 2 | 2 |
| 3 | 1 or 2 |
| 4 | 0, 1 or 2 |

As another example, a minimum code energy (or Hamming weight) of 7 can also be achieved if the minimum code energy of each part B codeword is 4 and the minimum code energy of each part A codeword is 3.

In one preferred embodiment, a 16/17 (0, 6/6) code with a minimum Hamming weight of 7 is implemented. Table 4 is a table for use as encoder 152 of FIG. 4 and shows the data input along with the corresponding codeword output (CW) and state number output (Nx St).

TABLE 4

State Diagram of 7-bit codeword mapping for 16/17 (0, 6/6) code [Min Hwt = 3]

| Data | CW | Nx St | Data | CW | Nx St | Data | CW | Nx St | Data | CW | Nx St |
|---|---|---|---|---|---|---|---|---|---|---|---|
| 00 | 0E | S0 | 40 | 4E | S0 | 80 | 0F | S0 | C0 | 4F | S0 |
| 01 | 16 | S0 | 41 | 2B | S0 | 81 | 17 | S0 | C1 | 6B | S0 |
| 02 | 26 | S0 | 42 | 3A | S0 | 82 | 27 | S0 | C2 | 7A | S0 |
| 03 | 36 | S0 | 43 | 43 | S1 | 83 | 37 | S0 | C3 | 43 | S2 |
| 04 | 46 | S0 | 44 | 2D | S0 | 84 | 47 | S0 | C4 | 6D | S0 |
| 05 | 56 | S0 | 45 | 39 | S0 | 85 | 57 | S0 | C5 | 79 | S0 |
| 06 | 66 | S0 | 46 | 46 | S1 | 86 | 67 | S0 | C6 | 46 | S2 |
| 07 | 76 | S0 | 47 | 47 | S1 | 87 | 77 | S0 | C7 | 47 | S2 |
| 08 | 61 | S0 | 48 | 25 | S0 | 88 | 71 | S0 | C8 | 35 | S0 |
| 09 | 62 | S0 | 49 | 49 | S1 | 89 | 72 | S0 | C9 | 49 | S2 |
| 0A | 63 | S0 | 4A | 4A | S1 | 8A | 73 | S0 | CA | 4A | S2 |
| 0B | 0B | S1 | 4B | 4B | S1 | 8B | 0B | S2 | CB | 4B | S2 |
| 0C | 65 | S0 | 4C | 4C | S1 | 8C | 75 | S0 | CC | 4C | S2 |
| 0D | 0D | S1 | 4D | 4D | S1 | 8D | 0D | S2 | CD | 4D | S2 |
| 0E | 0E | S1 | 4E | 4E | S1 | 8E | 0E | S2 | CE | 4E | S2 |
| 0F | 0F | S1 | 4F | 4F | S1 | 8F | 0F | S2 | CF | 4F | S2 |
| 10 | 1E | S0 | 50 | 5E | S0 | 90 | 1F | S0 | D0 | 5F | S0 |
| 11 | 1B | S0 | 51 | 3B | S0 | 91 | 5B | S0 | D1 | 7B | S0 |
| 12 | 1A | S0 | 52 | 52 | S1 | 92 | 5A | S0 | D2 | 52 | S2 |
| 13 | 13 | S1 | 53 | 53 | S1 | 93 | 13 | S2 | D3 | 53 | S2 |
| 14 | 1D | S0 | 54 | 3D | S0 | 94 | 5D | S0 | D4 | 7D | S0 |
| 15 | 19 | S0 | 55 | 29 | S0 | 95 | 59 | S0 | D5 | 69 | S0 |
| 16 | 16 | S1 | 56 | 56 | S1 | 96 | 16 | S2 | D6 | 56 | S2 |
| 17 | 17 | S1 | 57 | 57 | S1 | 97 | 17 | S2 | D7 | 57 | S2 |
| 18 | 23 | S0 | 58 | 58 | S1 | 98 | 43 | S0 | D8 | 58 | S2 |
| 19 | 19 | S1 | 59 | 59 | S1 | 99 | 19 | S2 | D9 | 59 | S2 |
| 1A | 1A | S1 | 5A | 5A | S1 | 9A | 1A | S2 | DA | 5A | S2 |
| 1B | 1B | S1 | 5B | 5B | S1 | 9B | 1B | S2 | DB | 5B | S2 |
| 1C | 1C | S1 | 5C | 5C | S1 | 9C | 1C | S2 | DC | 5C | S2 |
| 1D | 1D | S1 | 5D | 5D | S1 | 9D | 1D | S2 | DD | 5D | S2 |
| 1E | 1E | S1 | 5E | 5E | S1 | 9E | 1E | S2 | DE | 5E | S2 |
| 1F | 1F | S1 | 5F | 5F | S1 | 9F | 1F | S2 | DF | 5F | S2 |
| 20 | 2E | S0 | 60 | 6E | S0 | A0 | 2F | S0 | E0 | 6F | S0 |
| 21 | 0B | S0 | 61 | 61 | S1 | A1 | 4B | S0 | E1 | 61 | S2 |
| 22 | 6A | S0 | 62 | 62 | S1 | A2 | 4A | S0 | E2 | 62 | S2 |
| 23 | 23 | S1 | 63 | 63 | S1 | A3 | 23 | S2 | E3 | 63 | S2 |
| 24 | 0D | S0 | 64 | 64 | S1 | A4 | 4D | S0 | E4 | 64 | S2 |
| 25 | 25 | S1 | 65 | 65 | S1 | A5 | 25 | S2 | E5 | 65 | S2 |
| 26 | 26 | S1 | 66 | 66 | S1 | A6 | 26 | S2 | E6 | 66 | S2 |

TABLE 4-continued

State Diagram of 7-bit codeword mapping for 16/17 (0, 6/6) code [Min Hwt = 3]

| Data | CW | Nx St | Data | CW | Nx St | Data | CW | Nx St | Data | CW | Nx St |
|------|----|----|------|----|----|------|----|----|------|----|----|
| 27 | 27 | S1 | 67 | 67 | S1 | A7 | 27 | S2 | E7 | 67 | S2 |
| 28 | 33 | S0 | 68 | 68 | S1 | A8 | 53 | S0 | E8 | 68 | S2 |
| 29 | 29 | S1 | 69 | 69 | S1 | A9 | 29 | S2 | E9 | 69 | S2 |
| 2A | 32 | S0 | 6A | 6A | S1 | AA | 52 | S0 | EA | 6A | S2 |
| 2B | 2B | S1 | 6B | 6B | S1 | AB | 2B | S2 | EB | 6B | S2 |
| 2C | 2C | S1 | 6C | 6C | S1 | AC | 2C | S2 | EC | 6C | S2 |
| 2D | 2D | S1 | 6D | 6D | S1 | AD | 2D | S2 | ED | 6D | S2 |
| 2E | 2E | S1 | 6E | 6E | S1 | AE | 2E | S2 | EE | 6E | S2 |
| 2F | 2F | S1 | 6F | 6F | S1 | AF | 2F | S2 | EF | 6F | S2 |
| 30 | 3E | S0 | 70 | 7E | S0 | B0 | 3F | S0 | F0 | 7F | S0 |
| 31 | 31 | S1 | 71 | 71 | S1 | B1 | 31 | S2 | F1 | 71 | S2 |
| 32 | 32 | S1 | 72 | 72 | S1 | B2 | 32 | S2 | F2 | 72 | S2 |
| 33 | 33 | S1 | 73 | 73 | S1 | B3 | 33 | S2 | F3 | 73 | S2 |
| 34 | 34 | S1 | 74 | 74 | S1 | B4 | 34 | S2 | F4 | 74 | S2 |
| 35 | 35 | S1 | 75 | 75 | S1 | B5 | 35 | S2 | F5 | 75 | S2 |
| 36 | 36 | S1 | 76 | 76 | S1 | B6 | 36 | S2 | F6 | 76 | S2 |
| 37 | 37 | S1 | 77 | 77 | S1 | B7 | 37 | S2 | F7 | 77 | S2 |
| 38 | 38 | S1 | 78 | 78 | S1 | B8 | 38 | S2 | F8 | 78 | S2 |
| 39 | 39 | S1 | 79 | 79 | S1 | B9 | 39 | S2 | F9 | 79 | S2 |
| 3A | 3A | S1 | 7A | 7A | S1 | BA | 3A | S2 | FA | 7A | S2 |
| 3B | 3B | S1 | 7B | 7B | S1 | BB | 3B | S2 | FB | 7B | S2 |
| 3C | 3C | S1 | 7C | 7C | S1 | BC | 3C | S2 | FC | 7C | S2 |
| 3D | 3D | S1 | 7D | 7D | S1 | BD | 3D | S2 | FD | 7D | S2 |
| 3E | 3E | S1 | 7E | 7E | S1 | BE | 3E | S2 | FE | 7E | S2 |
| 3F | 3F | S1 | 7F | 7F | S1 | BF | 3F | S2 | FF | 7F | S2 |

Similarly, Table 5 is the encoding table for encoder 154 of FIG. 4 when state number 156 is zero. Table 6 is the encoding table when state number 156 is 1. Table 7 is the encoding table when state number 156 is 2.

TABLE 5

State 0 of 10-bit codewords for 16/17 (0, 6/6) code [Min Hwt = 4]

|    | 0 | 1 | 2 | 3 | 4 | 5 | 6 | 7 | 8 | 9 | A | B | C | D | E | F |
|----|---|---|---|---|---|---|---|---|---|---|---|---|---|---|---|---|
| 0X | 02F | 04D | 04E | 04F | 097 | 096 | 095 | 207 | 03B | 03C | 039 | 03A | 03F | 20D | 20E | 20F |
| 1X | 071 | 05D | 05E | 213 | 067 | 066 | 216 | 217 | 04B | 219 | 21A | 21B | 21C | 21D | 21E | 21F |
| 2X | 072 | 06D | 06E | 06F | 087 | 225 | 226 | 227 | 05B | 05C | 059 | 05A | 22C | 22D | 22E | 22F |
| 3X | 073 | 231 | 232 | 233 | 234 | 235 | 236 | 237 | 238 | 239 | 23A | 23B | 23C | 23D | 23E | 23F |
| 4X | 074 | 02D | 02E | 243 | 057 | 056 | 246 | 247 | 063 | 249 | 24A | 24B | 24C | 24D | 24E | 24F |
| 5X | 075 | 03D | 252 | 253 | 037 | 036 | 256 | 257 | 258 | 259 | 25A | 25B | 25C | 25D | 25E | 25F |
| 6X | 076 | 261 | 262 | 263 | 264 | 265 | 266 | 267 | 268 | 269 | 26A | 26B | 26C | 26D | 26E | 26F |
| 7X | 077 | 271 | 272 | 273 | 274 | 275 | 276 | 277 | 278 | 279 | 27A | 27B | 27C | 27D | 27E | 27F |
| 8X | 078 | 08D | 08E | 08F | 047 | 285 | 286 | 287 | 06B | 06C | 069 | 06A | 28C | 28D | 28E | 28F |
| 9X | 079 | 291 | 292 | 293 | 294 | 295 | 296 | 297 | 298 | 299 | 29A | 29B | 29C | 29D | 29E | 29F |
| AX | 07A | 09D | 09E | 09F | 2A4 | 2A5 | 2A6 | 2A7 | 09B | 09C | 099 | 09A | 2AC | 2AD | 2AE | 2AF |
| BX | 07B | 2B1 | 2B2 | 2B3 | 2B4 | 2B5 | 2B6 | 2B7 | 2B8 | 2B9 | 2BA | 2BB | 2BC | 2BD | 2BE | 2BF |
| CX | 07C | 2C1 | 2C2 | 2C3 | 2C4 | 2C5 | 2C6 | 2C7 | 2C8 | 2C9 | 2CA | 2CB | 2CC | 2CD | 2CE | 2CF |
| DX | 07D | 2D1 | 2D2 | 2D3 | 2D4 | 2D5 | 2D6 | 2D7 | 2D8 | 2D9 | 2DA | 2DB | 2DC | 2DD | 2DE | 2DF |
| EX | 07E | 2E1 | 2E2 | 2E3 | 2E4 | 2E5 | 2E6 | 2E7 | 2E8 | 2E9 | 2EA | 2EB | 2EC | 2ED | 2EE | 2EF |
| FX | 07F | 2F1 | 2F2 | 2F3 | 2F4 | 2F5 | 2F6 | 2F7 | 2F8 | 2F9 | 2FA | 2FB | 2FC | 2FD | 2FE | 2FF |

TABLE 6

State 1 of 10-bit codewords for 16/17 (0, 6/6) code [Min Hwt = 4]

|    | 0 | 1 | 2 | 3 | 4 | 5 | 6 | 7 | 8 | 9 | A | B | C | D | E | F |
|----|---|---|---|---|---|---|---|---|---|---|---|---|---|---|---|---|
| 0X | 0B5 | 0B4 | 0B7 | 0B6 | 0C6 | 0C7 | 0C9 | 107 | 0A5 | 0A6 | 0A7 | 10B | 0B1 | 10D | 10E | 10F |
| 1X | 0D1 | 0B8 | 0B9 | 113 | 0CA | 0CB | 116 | 117 | 0AC | 119 | 11A | 11B | 11C | 11D | 11E | 11F |
| 2X | 0D2 | 0BC | 0BD | 123 | 0C5 | 125 | 126 | 127 | 0AD | 129 | 12A | 12B | 12C | 12D | 12E | 12F |
| 3X | 0D3 | 131 | 132 | 133 | 134 | 135 | 136 | 137 | 138 | 139 | 13A | 13B | 13C | 13D | 13E | 13F |
| 4X | 0D4 | 0BA | 0BB | 143 | 0CC | 0CD | 146 | 147 | 0AE | 149 | 14A | 14B | 14C | 14D | 14E | 14F |
| 5X | 0D5 | 0B2 | 152 | 153 | 0CE | 0CF | 156 | 157 | 158 | 159 | 15A | 15B | 15C | 15D | 15E | 15F |
| 6X | 0D6 | 161 | 162 | 163 | 164 | 165 | 166 | 167 | 168 | 169 | 16A | 16B | 16C | 16D | 16E | 16F |
| 7X | 0D7 | 171 | 172 | 173 | 174 | 175 | 176 | 177 | 178 | 179 | 17A | 17B | 17C | 17D | 17E | 17F |
| 8X | 0D8 | 0BE | 0BF | 183 | 0C3 | 185 | 186 | 187 | 0AF | 189 | 18A | 18B | 18C | 18D | 18E | 18F |

TABLE 6-continued

State 1 of 10-bit codewords for 16/17 (0, 6/6) code [Min Hwt = 4]

|    | 0   | 1   | 2   | 3   | 4   | 5   | 6   | 7   | 8   | 9   | A   | B   | C   | D   | E   | F   |
|----|-----|-----|-----|-----|-----|-----|-----|-----|-----|-----|-----|-----|-----|-----|-----|-----|
| 9X | 0D9 | 191 | 192 | 193 | 194 | 195 | 196 | 197 | 198 | 199 | 19A | 19B | 19C | 19D | 19E | 19F |
| AX | 0DA | 1A1 | 1A2 | 1A3 | 1A4 | 1A5 | 1A6 | 1A7 | 1A8 | 1A9 | 1AA | 1AB | 1AC | 1AD | 1AE | 1AF |
| BX | 0DB | 1B1 | 1B2 | 1B3 | 1B4 | 1B5 | 1B6 | 1B7 | 1B8 | 1B9 | 1BA | 1BB | 1BC | 1BD | 1BE | 1BF |
| CX | 0DC | 1C1 | 1C2 | 1C3 | 1C4 | 1C5 | 1C6 | 1C7 | 1C8 | 1C9 | 1CA | 1CB | 1CC | 1CD | 1CE | 1CF |
| DX | 0DD | 1D1 | 1D2 | 1D3 | 1D4 | 1D5 | 1D6 | 1D7 | 1D8 | 1D9 | 1DA | 1DB | 1DC | 1DD | 1DE | 1DF |
| EX | 0DE | 1E1 | 1E2 | 1E3 | 1E4 | 1E5 | 1E6 | 1E7 | 1E8 | 1E9 | 1EA | 1EB | 1EC | 1ED | 1EE | 1EF |
| FX | 0DF | 1F1 | 1F2 | 1F3 | 1F4 | 1F5 | 1F6 | 1F7 | 1F8 | 1F9 | 1FA | 1FB | 1FC | 1FD | 1FE | 1FF |

TABLE 7

State 2 of 10-bit codewords for 16/17 (0, 6/6) code [Min Hwt = 4]

|      | 0   | 1   | 2   | 3   | 4   | 5   | 6   | 7   | 8   | 9   | A   | B   | C   | D   | E   | F   |
|------|-----|-----|-----|-----|-----|-----|-----|-----|-----|-----|-----|-----|-----|-----|-----|-----|
| 0X   | 0E1 | 0E4 | 0E2 | 303 | 0E8 | 0EC | 306 | 307 | 0E3 | 309 | 30A | 30B | 30C | 30D | 30E | 30F |
| 1X   | 0F1 | 0E5 | 312 | 313 | 0E9 | 0ED | 316 | 317 | 318 | 319 | 31A | 31B | 31C | 31D | 31E | 31F |
| 2X   | 0F2 | 321 | 322 | 323 | 324 | 325 | 326 | 327 | 328 | 329 | 32A | 32B | 32C | 32D | 32E | 32F |
| 3X   | 0F3 | 331 | 332 | 333 | 334 | 335 | 336 | 337 | 338 | 339 | 33A | 33B | 33C | 33D | 33E | 33F |
| 4X   | 0F4 | 0E6 | 342 | 343 | 0EA | 0EE | 346 | 347 | 348 | 349 | 34A | 34B | 34C | 34D | 34E | 34F |
| 5X   | 0F5 | 0E7 | 352 | 353 | 0EB | 0EF | 356 | 357 | 358 | 359 | 35A | 35B | 35C | 35D | 35E | 35F |
| 6X   | 0F6 | 361 | 362 | 363 | 364 | 365 | 366 | 367 | 368 | 369 | 36A | 36B | 36C | 36D | 36E | 36F |
| 7X   | 0F7 | 371 | 372 | 373 | 374 | 375 | 376 | 377 | 378 | 379 | 37A | 37B | 37C | 37D | 37E | 37F |
| 8X   | 0F8 | 381 | 382 | 383 | 384 | 385 | 386 | 387 | 388 | 389 | 38A | 38B | 38C | 38D | 38E | 38F |
| 9X   | 0F9 | 391 | 392 | 393 | 394 | 395 | 396 | 397 | 398 | 399 | 39A | 39B | 39C | 39D | 39E | 39F |
| AX   | 0FA | 3A1 | 3A2 | 3A3 | 3A4 | 3A5 | 3A6 | 3A7 | 3A8 | 3A9 | 3AA | 3AB | 3AC | 3AD | 3AE | 3AF |
| BX   | 0FB | 3B1 | 3B2 | 3B3 | 3B4 | 3B5 | 3B6 | 3B7 | 3B8 | 3B9 | 3BA | 3BB | 3BC | 3BD | 3BE | 3BF |
| CX   | 0FC | 3C1 | 3C2 | 3C3 | 3C4 | 3C5 | 3C6 | 3C7 | 3C8 | 3C9 | 3CA | 3CB | 3CC | 3CD | 3CE | 3CF |
| DX   | 0FD | 3D1 | 3D2 | 3D3 | 3D4 | 3D5 | 3D6 | 3D7 | 3D8 | 3D9 | 3DA | 3DB | 3DC | 3DD | 3DE | 3DF |
| EX   | 0FE | 3E1 | 3E2 | 3E3 | 3E4 | 3E5 | 3E6 | 3E7 | 3E8 | 3E9 | 3EA | 3EB | 3EC | 3ED | 3EE | 3EF |
| LLFX | 0FF | 3F1 | 3F2 | 3F3 | 3F4 | 3F5 | 3F6 | 3F7 | 3F8 | 3F9 | 3FA | 3FB | 3FC | 3FD | 3FE | 3FF |

Figure 6:
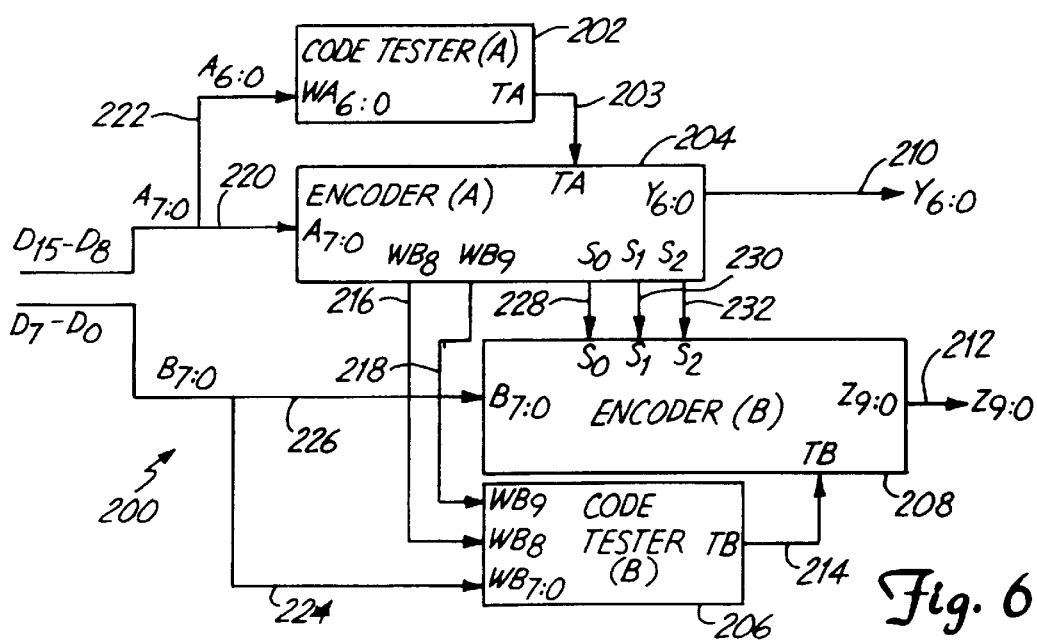
FIG. 6 is a block diagram of an encoder in accordance with a second embodiment of the present invention.

The present invention can also be implemented using combinational logic instead of a look-up table. FIG. 6 shows a block diagram for an encoder 200 for producing a rate 16/17 code with minimum Hamming weight of 7 and a run-length-limited constraint of 6 for the entire encoded sequence and 6 for each interleave in the sequence. Encoder 200 is divided into two parts, part A and part B. Part A consists of code tester (A) 202 and encoder (A) 204 and part B consists of code tester (B) 206 and encoder (B) 208.

Encoder (A) 204 receives the 8 most significant bits ($D_{15}$–$D_8$) of a 16 bit input data word ($D_{15:0}$) along input bus 220. These 8 bits are denoted as $A_{7:0}$ in encoder (A) 204, which is shorthand for a string of 8 bits: $A_7A_6A_5A_4A_3A_2A_1A_0$. Of the 8 bits received by encoder (A) 204, code tester (A) 202 receives the least significant 7 bits, denoted as $WA_{6:0}$ in code tester (A) 202, along bus 222.

Code tester (A) 202 produces output TA 203 which is input to encoder (A) 204. Based on TA 203 and inputs $A_{7:0}$, encoder (A) 204 produces 7 code bits $Y_{6:0}$ on output bus 210. Encoder (A) 204 also produces three state variables $S_0$, $S_1$ and $S_2$ and two part B bits $WB_8$ and $WB_9$.

Part B bits $WB_8$ and $WB_9$ are input to code tester (B) 206, along lines 216 and 218, respectively. Code tester (B) 206 also receives the least significant 8 bits ($D_7$–$D_0$) of the input data word along input data bus 224. These bits are denoted as input bits $WB_{7:0}$ in code tester (B) 206. Based on inputs $WB_{7:0}$, $WB_8$ and $WB_9$, code tester (B) 206 produces an output TB 214 which is input to encoder (B) 208.

In addition to receiving TB 214, encoder (B) 208 receives state variables $S_0$, $S_1$ and $S_2$ along lines 228, 230 and 232, respectively, and the least significant 8 bits ($D_7$–$D_0$) of the input data word along input bus 226. Within encoder (B) 208, the least significant 8 bits of the input data word are denoted as $B_{7:0}$. Based upon all of the input values, encoder (B) 208 produces 10 output code bits $Z_{9:0}$ along output bus 212.

The combinational logic used by code tester (A) 202, encoder (A) 204, code tester (B) 206, and encoder (B) 208 is described below using the following symbols:

"|" represents a bitwise OR;

"&"0 represents a bitwise AND;

"+" represents an arithmetic sum;

"ô" represents XOR; and

"$\overline{X}$" represents the inverse of X.

In addition, in these equations, the subscript numbering notation is replaced by a single script notation. Thus, in the equations that follow, $S_0$ is represented as S0, $B_1$ is represented as B1 and so forth.

Code tester (A) 202 produces output TA 203 based upon inputs $WA_{6:0}$ using the following equations:

| UA0 = WA6 | WA5 | WA4 | WA3 | Eq. 1 |
| UA1 = WA3 | WA2 | WA1 | WA0 | Eq. 2 |
| UA2 = WA6 | WA4 | WA2 | WA0 | Eq. 3 |
| UA3 = WA5 | WA3 | WA1 | | Eq. 4 |

-continued

```
{   HWA = WA6+WA5+WA4+WA3+WA2+WA1+WA0
    if (HWA>2)
        UA4=1
    else
        UA4=0
}                                                        Eq. 5
TA = UA0 & UA1 & UA2 & UA3 & UA4                         Eq. 6
```

Encoder (A) 204 produces output 210 ($Y_{6:0}$) using input bits $A_{7:0}$ and TA 203 in equations 7 through 29 below.

| | | |
|---|---|---|
| NH0 = | $\underline{A7}$ & $\underline{A6}$ & $\underline{A5}$ & $\underline{A4}$ | Eq. 7 |
| NH8 = | $\underline{A7}$ & $\underline{A6}$ & $\underline{A5}$ & A4 | Eq. 8 |
| NL1 = | $\underline{A3}$ & $\underline{A2}$ & $\underline{A1}$ & A0 | Eq. 9 |
| NL2 = | $\underline{A3}$ & $\underline{A2}$ & A1 & $\underline{A0}$ | Eq. 10 |
| NL4 = | $\underline{A3}$ & A2 & $\underline{A1}$ & $\underline{A0}$ | Eq. 11 |
| NL5 = | $\underline{A3}$ & A2 & $\underline{A1}$ & A0 | Eq. 12 |
| GA = | $\underline{A3}$&$\underline{A2}$&$\underline{A1}$&$\underline{A0}$ | Eq. 13 |
| HA = | (A6\|A5 \|A4)&(NL4 \|NL1) | Eq. 14 |
| JA = | (A6\|A5 \|A4)&(NL5 \|NL2) | Eq. 15 |
| KA = | ($\underline{A6}$&$\underline{A5}$&$\underline{A4}$)&($\underline{A3}$&($\underline{A2}$\|A1 \|A0)) | Eq. 16 |
| LA = | A3&(NH8 \| NH0) | Eq. 17 |
| MA = | (A6\|A5 \| A4)&A3 | Eq. 18 |
| YY6 = | (KA&A2) \| LA \| (MA&(A7&$\underline{A6}$)) | Eq. 19 |
| Y6 = | (TA&A6) \| ($\underline{TA}$&( (GA&A6) \| (HA&A7) \| (JA&(A7 \| ($\underline{A7}$&A5)))\|YY6 )) | Eq. 20 |
| YY5 = | (KA&A1) \|LA\| (MA&(A7\|A6)) | Eq. 21 |
| Y5 = | (TA&A5) \| ($\underline{TA}$&((GA&A5)\| (HA&A6) \| (JA&(A6 \| (A7&A5))) \|YY5 )) | Eq. 22 |
| YY4 = | (KA&A$\cap$) \| (LA&A7) \| (MA&(A5\|(A7&A6))) | Eq. 23 |
| Y4 = | (TA&A4) \| ($\underline{TA}$&((GA&A4) \| (HA&A4) \| (JA&(A6^A4)) \| YY4 )) | Eq. 24 |
| Y3 = | (TA&A3) \| ($\underline{TA}$&( GA\|HA\|JA )) | Eq. 25 |
| Y2 = | (TA&A2) \| ($\underline{TA}$&( GA\| (HA&A2) \| KA \| (LA&A2) \| (MA&A6) )) | Eq. 26 |
| Y1 = | (TA&A1) \| ($\underline{TA}$&( GA\|((HA\|LA)&A0) \| ((JA\|LA)&A1) \| KA\| (MA&$\underline{A6}$) )) | Eq. 27 |
| YY0 = | (KA&A7) \| (LA&$\underline{A0}$) \| (MA&$\underline{A1}$) | Eq. 28 |
| Y0 = | (TA&A0) \| ($\underline{TA}$&( ((GA\|KA)&A7) \|HA\| (JA&A0) \| YY0 )) | Eq. 29 |

Encoder (A) 204 produces state variables $S_0$, $S_1$ and $S_2$ using the following equations:

| | |
|---|---|
| S2 = A7 & TA | Eq. 30 |
| S1 = $\underline{A7}$ & TA | Eq. 31 |
| S0 = $\underline{TA}$ | Eq. 32 |

And encoder (A) 204 produces bits $WB_8$ and $WB_9$ using the following equations:

| | |
|---|---|
| WB9 = S2\|S0 | Eq. 33 |
| WB8 = S2\|S1 | Eq. 34 |

Code tester (B) 206 produces output TB 214 using input bits $WB_{7:0}$ of the input data word and bits $WB_8$ and $WB_9$ from encoder (A) 204 in the following equations:

| | | |
|---|---|---|
| UB0 = | WB9 \| WB8 \| WB7\| WB6 \| WB5 | Eq. 35 |
| UB1 = | WB8 \| WB7 \| WB6\| WB5 \| WB4 \| WB3\| WB2 | Eq. 36 |
| UB2 = | WB7 \| WB6 \| WB5\| WB4 \| WB3 \| WB2\| WB1 | Eg. 37 |
| UB3 = | WB3 \| WB2 \| WB1\| WB0 | Eq. 38 |
| UB4 = | WB7 \| WB5 \| WB3\| WB1 | Eq. 39 |
| UB5 = | WB8 \| WB6 \| WB4\| WB2 | Eq. 40 |

```
{   HWB =WB9+WB8+WB7+WB6+WB5+WB4+
        WB3+WB2+WB1+WB0
    if  (HWB>3)
        UB6= 1
    else
        UB6=0
}                                                        Eq. 41
TB = UB0 & UB1 & UB2 & UB3 &                             Eq. 42
     UB4 & UB5 & UB6
```

Encoder (B) 208 produces output bits 212 ($Z_{9:0}$) using the least significant 8 bits of the input data word ($B_{7:0}$), the three state variables $S_0$, $S_1$ and $S_2$ and TB 214 in the following equations:

| | | |
|---|---|---|
| NH0 = | $\underline{B7}$&$\underline{B6}$&$\underline{B5}$&$\underline{B4}$ | Eq. 43 |
| GB = | (B7\|B6\|B5\|B4) & ($\underline{B3}$&$\underline{B2}$&$\underline{B1}$&$\underline{B0}$) | Eq. 44 |
| HB = | ( $\underline{TB}$&S2&($\underline{GB}$) ) | Eq. 45 |
| JB = | ( $\underline{TB}$&S1&$\underline{GB}$& (($\underline{B3}$&$\underline{B2}$) \| (B3&B2)) ) | Eq. 46 |
| KB = | ( $\underline{TB}$&S1&(B3^B2) ) | Eq. 47 |
| LB = | ( $\underline{TB}$&S0&$\underline{B3}$&$\underline{B2}$) | Eq. 48 |
| MB = | ( $\underline{TB}$&S0&B3&B2) | Eq. 49 |
| NB = | ( $\underline{TB}$&S0&$\underline{GB}$&(($\underline{B3}$&$\underline{B2}$) \| (B3&B23)) ) | Eq. 50 |
| Z9 = | (TB&(S2 \| S0)) | Eq. 51 |
| Z8 = | (TB&(S1 \| S2)) | Eq. 52 |
| ZZ7 = | (MB&$\underline{B7}$&$\underline{B6}$&$\underline{B4}$) \| (NB&B7) | Eq. 53 |
| Z7 = | (TB&B7) \| ($\underline{TB}$&(ZZ7 \| ((S2\|S1)&GB) \| HB\|JB\|KB\|(LB&B7&B5)  )) | Eq. 54 |
| ZZ6 = | (MB&((B6^B4) \| B7)) \| (NB&$\underline{B7}$&$\underline{B6}$&(B1\|B0)) | |
| Z6 = | (TB&B6) \| ($\underline{TB}$&(Z6\|GB\|HB\|(KB&B2) \| (LB&(B6 \| B4 \| (B7^B5)))  )) | Eq. 55 Eq. 56 |
| ZZ5 = | (MB&B4) \| (NB&(B6 \| (B5&$\underline{B7}$) \| ($\underline{B1}$&$\underline{B0}$))) | Eq. 57 |
| Z5 = | (TB&B5) \| ($\underline{TB}$&(Z5 \| ((S2\|S0)&GB) \| HB\|JB\|(KB&B3)\|(LB&$\underline{B5}$&$\underline{B4}$)  )) | Eq. 58 |
| ZZ4 = | (MB&(($\underline{B7}$&$\underline{B5}$&$\underline{B4}$)\|B6))\| NB&(B4 \|B3\|(B7&B5))) | Eq. 59 |
| Z4 = | (TB&B4) \| (TB&(ZZ4\|GB\|JB\| (LB&(B5 \| ($\underline{B7}$&$\underline{B6}$&$\underline{B4}$))  )) | Eq. 60 |
| ZZ3 = | (KB&( (B2&(B6\|B4\|B1) ) \| (B3&(B7\|B6\|B5\|B4)))) \| (LB&$\underline{B6}$) \|NB | Eq. 61 |
| Z3 = | (TB&B3) \| ($\underline{TB}$&(Z3 \| (GB&B7) (HB&B2) \| (JB&(B7 \| B5 \| (B6^B4)))  )) | Eq. 62 |
| ZZ2 = | (KB&(($\underline{B7}$&$\underline{B1}$&(B6\|$\underline{B4}$)) \|B3)) \| (LB&$\underline{B1}$&B0) \|MB\|NB | Eq. 63 |
| Z2 = | (TB&B2) \| ($\underline{TB}$&(ZZ2\|(GB&B6) \| (HB&B0) \| (JB&(B7\|B5\|(NH0&$\underline{B3}$))  )) | Eq. 64 |
| ZZ1A = | (LB&((B1&B0) \| ($\underline{B1}$&$\underline{B0}$))\| (MB&B1)\|(NB&(B1\|($\underline{B1}$&$\underline{B0}$)) | Eq. 65 |
| ZZ1 = | (KB&((B2&$\underline{B5}$&$\underline{B1}$&($\underline{B6}$\|B4))\| (B3&(B7\|B6\|B1\|B0))))\|ZZ1A | Eq. 66 |
| Z1 = | (TB&B1) \| ($\underline{TB}$&(ZZ1 \| (GB&B5) \| (HB&(B6\|B3\|B1))\|(JB&(B7\|B6\|(NH0&B1)))  )) | Eq. 67 |
| ZZ0A = | (LB&B0) \| (MB&$\underline{B0}$) \| (NB&(B0 \| ($\underline{B1}$&$\underline{B0}$))) | Eq. 68 |
| ZZ0 = | (KB&((B2&(B7\|B5\|B1&B0))\| (B3&(B7\|B5\|B1\|(NH0&B0)))))\|ZZ0A | Eq. 69 |
| Z0 = | (TB&B0) \| ($\underline{TB}$&(Z0 \| (GB&B4) \| (HB&(B4 \| ($\underline{B2}$&$\underline{B1}$&$\underline{B0}$))) \| (JB&B0)  )) | Eq. 70 |

The 7 output bits 210 ($Y_{6:0}$) and the 10 output bits 212 ($Z_{9:0}$) are concatenated together to form a 17 bit codeword.

Figure 7:
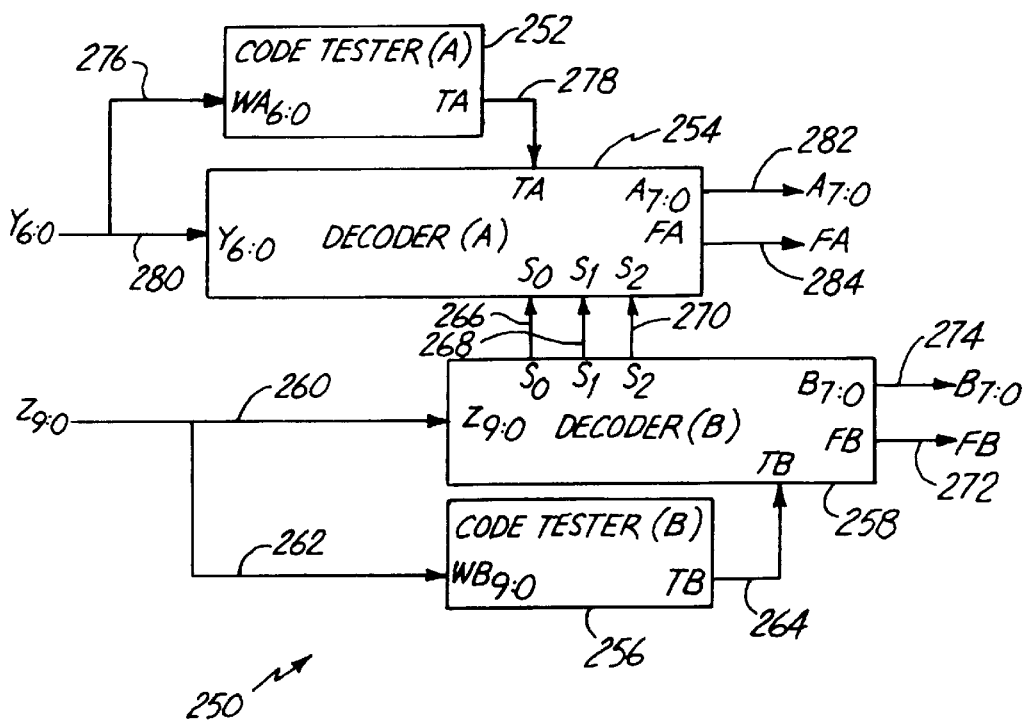
FIG. 7 is a block diagram of a decoder in accordance with a second embodiment of the present invention.

FIG. 7 is a block diagram of a decoder 250 for decoding the codewords produced by encoder 200. Decoder 250 includes a part A and a part B, where part A includes code tester (A) 252 and decoder (A) 254, and part B includes code tester (B) 256 and decoder (B) 258.

The least significant 10 bits of each codeword ($Zg_{9:0}$) are input to part B of decoder 250 along input bus 260. Code tester (B) 256 receives the same 10 code bits along input bus 262, but denotes the 10 bits as $WB_{9:0}$. Code tester (B) 256 uses these input bits to produce output TB 264 using equations 35 through 42 described above. Thus, code tester (B) 256 contains the same combinational logic as code tester (B) 206 of FIG. 6. The code tester circuit 206 may be shared by the encoder (FIG. 6) and the decoder (FIG. 7).

Output TB 264 is input to decoder (B) 258 along with the 10 least significant bits of the codeword ($Z_{9:0}$) Decoder (B) 258 uses these inputs to produce state outputs $S_0, S_1$ and $S_2$, along lines 266, 268 and 270, respectively, invalid codeword indicator FB on line 272, and the 8 least significant bits ($B_{7:0}$) of the recovered data word along output bus 274. Invalid codeword indicator FB is simply the inverse of TB 264 and variables $S_0$, $S_1$ and $S_2$ and recovered data bits $B_{7:0}$ are produced using the following equations:

| | | |
|---|---|---|
| P0 = | ($\overline{Z7}$ \| (Z6 & $\overline{Z5}$)) &(Z6 \| $\overline{Z5}$ \| $\overline{Z4}$) | Eq. 71 |
| GZ = | Z6 & Z4 & (Z7 \| Z5) | Eq. 72 |
| HZ = | Z7 & Z6 & Z5 & $\overline{Z4}$ | Eq. 73 |
| JZ, = | Z7 & $\overline{Z6}$ & Z5 & Z4 | Eq. 74 |
| KZ = | Z7 & $\overline{Z4}$ & (Z6 ˆ Z5) | Eq. 75 |
| LZ = | P0 & ( (Z3 & ($\overline{Z2}$ \| ($\overline{Z1}$ & $\overline{Z0}$))) | |
| | \| ($\overline{Z3}$ & $\overline{Z2}$) ) | Eq. 76 |
| MZ = | P0 & ($\overline{Z3}$ & Z2) | |
| NZ = | P0 & ($\overline{Z3}$ & Z2 & (Z1 \| Z0)) | Eq. 77 |
| | Eq. 78 | |
| BB7 = | (LZ&(Z7 \| (Z6&Z5&Z3))) \| | Eq. 79 |
| | (MZ&$\overline{Z7}$&Z6&$\overline{Z5}$&$\overline{Z4}$) \| (NZ&Z7) | |
| B07 = | BB7 \| (GZ&Z3) \| (JZ&Z3&Z2&Z1) \| | Eq. 80 |
| | (KZ&(($\overline{Z3}$,&$\overline{Z2}$) \| (Z5&Z3&Z1&Z0))) | |
| BB6A= | (LZ&$\overline{Z3}$) \| (MZ&Z7&Z4) \| | Eq. 81 |
| | (NZ&$\overline{Z6}$&Z5&($\overline{Z1}$ \| Z0)) | |
| BB6 = | BB6A \| (KZ&((Z5&Z3&Z2) \| | Eq. 82 |
| | (Z5&Z3&Z1&$\overline{Z0}$))) | |
| B06 = | BB6 \| (GZ&Z2) \| (HZ&Z1&(Z3 \| Z2)) | Eq. 83 |
| | \| (JZ&$\overline{Z2}$ &Z1) | |
| BB5A = | (LZ&(Z7 \| (Z6&Z4))) \| (MZ&Z7&$\overline{Zn4}$) | Eq. 84 |
| | \| (NZ&( (Z7&Z4) \| (Z6&Z5))) | |
| BB5 = | BSA \| (KZ&((Z2&$\overline{Z1}$ &Z0)&((Z6&$\overline{Z3}$))) | Eq. 85 |
| | \| Z5&Z3)))) | |
| B05 = | BB5 \| (GZ&Z1) \| (JZ&Z3&Z2&$\overline{Z1}$) | Eq. 86 |
| BB4A= | (LZ&(Z6&$\overline{Z5}$ & $\overline{Z4}$)) \| (MZ&Z5) | Eq. 87 |
| | (NZ&Z4& (Z6\|$\overline{Z7}$&$\overline{Z1}$))) | |
| BB4 = | BB4A \| (KZ&((Z6&Z3&Z1) \| | Eq. 88 |
| | (Z5&$\overline{Z1}$&Z0))) | |
| B04 = | BB4 \| (GZ&Z0) \| (HZ&Z0& | Eq. 89 |
| | (Z3 \| Z2)) \| (JZ&$\overline{Z2}$&(Z3 ˆ Z1)) | |
| BB3 = | (LZ) \| (NZ&Z5&Z4&Z1) | Eq. 90 |
| B03 = | BB3 \| (HZ&$\overline{Z3}$&$\overline{Z2}$&Z1&Z0) \| | Eq. 91 |
| | (JZ&$\overline{Z3}$&$\overline{Z2}$&Z1&Z0) \| (KZ&Z5) | |
| BB2 = | (MZ) \| (NZ&Z5&Z4&Z1) | Eq. 92 |
| B02 = | BB2 \| (HZ&Z3) | Eq. 93 |
| | (JZ&Z3&Z2&Z1&Z0) \| (KZ&Z6) | |
| BB1A = | (LZ&(Z3&Z2&(Z1\|Z0))) \| | Eq. 94 |
| | (MZ&Z1) \| (NZ&Z1&(Z7\|Z6\|Z0)) | |
| BB1 = | BB1A \| (KZ&((Z6&Z2&Z1) \| | Eq. 95 |
| | (Z5&Z3&Z1&Z0))) | |
| B01 = | BB1 \| (HZ&Z3&Z2&Z1&Z0) \| | Eq. 96 |
| | (JZ&((Z3&Z2&Z1) \| (Z3&Z0))) | |
| BB0A = | (LZ&(Z0) \| (MZ&Z0) \| | Eq. 97 |
| | (NZ&Z0&(Z7\|Z6\|Z1)) | |
| BB0 = | BB0A \| (KZ&((Z6&Z0&((Z1&Z2) \| | Eq. 98 |
| | (Z3&(Z1\|Z2)) )) \| (Z5&Z3&Z1&Z0))) | |
| B00 = | BB0 \| (HZ&Z2) \| (JZ&Z0) | Eq. 99 |
| ZZ = | Z9&Z8 | Eq. 100 |
| S2 = | (Z9&Z8) \| (ZZ&Z7&Z6&Z5) | Eq. 101 |
| S1 = | (Z9&Z8) \| (ZZ&(Z7&(Z6 Z5))) | Eq. 102 |
| S0 = | (Z9&Z8) \| ( ZZ&(Z7\|(Z6&Z5))) | Eq. 103 |
| B7 = | ( ZZ & B07) \| (ZZ & Z7) | Eq. 104 |
| B6 = | ( ZZ & B06) \| (ZZ & Z6) | Eq. 105 |
| B5 = | ( ZZ & B05) \| (ZZ & Z5) | Eq. 106 |
| B4 = | ( ZZ & B04) \| (ZZ & Z4) | Eq. 107 |
| B3 = | ( ZZ & B03) \| (ZZ & Z3) | Eq. 108 |
| B2 = | ( ZZ & B02) \| (ZZ & Z2) | Eq. 109 |
| B1 = | ( ZZ & B01) \| (ZZ & Z1) | Eq. 110 |
| B0 = | ( ZZ & B00) \| (ZZ & Z0) | Eq. 111 |

Code tester (A) 252 receives the 7 most significant bits of the codeword, which are represented as $WA_{6:0}$ in code tester (A) 252, along input bus 276. Code tester (A) 252 uses equations 1 through 6 described above together with the input bits to produce output TA 278, which is provided to decoder (A) 254. Thus, code tester (A) 252 contains the same combinational logic as code tester (A) 202 of FIG. 6.

Decoder (A) 254 also receives the most significant 7 bits ($Y_{6:0}$) of the codeword along input bus 280 and state variables $S_0$, $S_1$ and $S_2$ from decoder (B) 258 along lines 266, 268, and 270, respectively. Decoder (A) 254 uses these input values to produce the 8 most significant bits ($A_{7:0}$) of the recovered data word and an invalid codeword indicator FA along output bus 282 and line 284, respectively.

Invalid codeword indicator FA is simply the inverse of TA 278 from code tester (A) 252. Recovered data bits $A_{7:0}$ are determined using the following equations:

| | | |
|---|---|---|
| GY = | Y3&Y2&Y1 | Eq. 112 |
| HY = | Y3&Y0&(Y2ˆY1) | Eq. 113 |
| JY = | Y3&$\overline{Y2}$&(Y1 ee Y0) | Eq. 114 |
| KY = | Y3&Y2&Y1 | Eq. 115 |
| LY = | Y6&Y5&Y3 & (Y2\|Y1) | Eq. 116 |
| MY = | Y3&KY&LY | Eq. 117 |
| A07 = | (GY\|KY)&Y0) \| (HY&Y6) \| (JY&Y6&(Y4\|Y5\|Y1)) | Eq. 118 |
| | \| (LY&Y4) \| (MY&(Y6\|(Y4&Y2))) | |
| A06 = | (GY&Y6) \| (HY&Y5) \| | |
| | (JY&(Y5&(Y4\|Y0))) \| (MY&Y2) | |
| A05 = | (GY&Y5)\| (HY&Y5&Y4) \| (JY&Y6&Y4&((Y5&Y1) | |
| | \|(Y5)) \| (MY&(Y4&Y1)) | |
| A04 = | (GY\|HY)&Y4) \| (JY&((Y5&Y4) \| | Eq. 119 |
| | (Y4&Y0))) \| (MY&(Y4&Y2)) | Eq. 120 |
| A03 = | LY \| MY | Eq. 121 |
| A02 = | (HY&Y2) \| (JY&Y0) \| (KY&Y6) \| (LY&Y2) | |
| A01 = | ((JY&Y1) \| (KY&Y5) \| | Eq. 122 |
| | (LY&Y1&Y0) \| (MY&Y1&Y0) | Eq. 123 |
| A00 = | (HY&Y1) \| (JY&Y0) \| (KY&Y4) | |
| | \|(LY&Y1&Y0) | Eq. 124 |
| S12 = | S2 \| S1 | Eq. 125 |
| A7 = | (S2) \| (S0 & A07) | Eq. 126 |
| A6 = | ( S12 & Y6) \| (S0 & A06) | Eq. 127 |
| A5 = | ( S12 & Y5) \| (S0 & A05) | Eq. 128 |
| A4 = | ( S12 & Y4) \| (S0 & A04) | Eq. 129 |
| A3 = | ( S12 & Y3) \| (S0 & A03) | Eq. 130 |
| A2 = | ( S12 & Y2) \| (S0 & A02) | Eq. 131 |
| A1 = | ( S12 & Y1) \| (S0 & A01) | Eq. 132 |
| A0 = | ( S12 & Y0) \| (S0 & A00) | Eq. 133 |

In general, the preferred embodiment includes a storage device 100 having a storage medium 102 and a write element 108 positioned adjacent the storage medium 102 to write information to the storage medium 102 in response to a write signal input. The device 100 also includes a data input 112 providing a plurality of data input bits to a first block encoder 152. The first block encoder 152 provides a first encoded data output to the write element 108 as a function of a portion of the data input 112. The first encoder also provides a state number output 156 as a function of the data input. The second encoder 154 also couples the data input 112 and provides a second encoded output to the write element 108 as a function of a portion of the data input 112 and as a function of the state number output 156. Further, the first and second encoder output may be provided to a PRML precoder 126 which responsively provides the write signal to the write element 108. Another aspect of the invention is for use with block decoders. In this aspect, storage device 100 includes read element 108 which reads information from storage medium 102 and responsively provides a read signal output. A first decoder 162 is coupled to the read element and provides a state number output 166 and a first decoded data output as a function of a portion of a read signal output from the read element 108. The first decoded output is provided to a system data output 114. A second decoder couples to the read element 108 and provides a second decoded data output 114 as a function of the read signal output and as a function of the state number output 166. The second decoded output is also provided to the data output 114. Further, a PRML detector 132 may also be provided between read element 108 and decoders 162 and 164.

Thus, the present encoder/decoder greatly reduces the number of entries in a table of the type used in encoding and decoding.

In general, the encoder/decoder provides a plurality of block encoding/decoding tables in which an output from one table is used as an input to another table. This allows the overall number of data entries to be reduced without sacrificing the constraints placed on the code. The encoder/decoder may be implemented as appropriate including software or hardware implementations. Further, the particular codes, number of tables, number of state, etc., may change for any particular application. The encoder/decoder may use other techniques as desired including algorithm based or adaptive data translation techniques. Aspects of the invention include the division of codewords into two unequal parts and implementation of state dependent encoding/decoding with a different number of states for each pair. Further, each part of the decoder input has the same length. The code tester can be used to reduce logic count because the input data pattern can be used directly as the codeword if it satisfies the code constraints. The code tester checks the constraints and sends a signal to the encoder if the input word directly satisfies the constraints.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the block encoder and decoder while maintaining substantially the same functionality without departing from the scope and spirit of the present invention. In addition, although the preferred embodiment described herein is directed to a storage device it will be appreciated by those skilled in the art that the teachings of the present invention can be applied to other systems, like data communication in general, without departing from the scope and spirit of the present invention. Various other codes may also be used, more than one encoding or decoding table may be linked together, additional or different state numbers may be used, the data provided to the encoders or decoders may be partitioned or may overlap as desired, etc.

What is claimed is:

1. A communication channel, comprising:

a medium;

an output element to output information to the medium in response to received data encoded bits;

a data input having a plurality of data input bits;

a first encoder including a state number output and a first encoded data output which outputs encoded bits as a function of a first portion of bits from a plurality of data bits in an input data stream, the first encoded data output coupled to the output element; and a second encoder including a second encoded data output which outputs data encoded bits as a function of a second portion of data bits from the plurality of data bits in the input data stream and as a function of the state number output, the second encoded data output coupled to the output element.

2. The communication channel of claim 1 wherein the first encoder comprises a first look-up table configured to map the first portion of bits into the first encoded data output and the state number output.

3. The storage device of claim 2 wherein the first table includes at most $2^8 \times 7$ data entries for each state number.

4. The communication channel of claim 1 wherein the first encoder comprises an algorithm responsively translating the first portion of bits into the first encoded output and the state number output.

5. The communication channel of claim 1 wherein the second encoder comprises a second look-up table configured to map the second portion of bits and the state number output into the second encoded data output.

6. The communication channel of claim 5 wherein the second table includes $2^8 \times 10$ data entries for each state number output and there are 3 state number outputs.

7. The communication channel of claim 1 wherein the second encoder comprises an algorithm responsively translating the second portion of bits and the state number output into the second encoded output.

8. The communication channel claim 1 wherein the first encoder and the second encoder include tables of codewords for the first and second encoded data outputs, the codewords selected to provide a desired minimum codeword energy.

9. The communication channel of claim 1 including a partial response maximum likelihood encoder coupled between the first and second encoded data outputs and the write signal input.

10. The communication channel of claim 9 wherein the partial response maximum likelihood encoder comprises a class 4 partial response precoder.

11. The communication channel of claim 1 wherein the state number output link between the first encoded data output and the second encoded data output to selectively constrain the output from the output element.

12. The communication channel of claim 1 wherein the medium comprises a storage medium and the output element comprises a head proximate the medium.

13. The communication channel of claim 12 wherein the storage medium comprises a disc.

14. A communication channel, comprising:

a medium;

an input element to receive information from the medium and responsively provide a received signal having a plurality of data bits;

a data output;

a first decoder responsively outputting a first decoded data output to the data output and a state number output as a function of a first portion of the plurality of data bits; and a second decoder responsively outputting a second decoded data output to the data output as a function of a second portion of the plurality of data bits and as a function of the state number output.

15. The communication channel of claim 14 wherein the first decoder comprises a first look-up table configured to map the first portion of the plurality of data bits into the first decoded data output and the state number.

16. The communication channel of claim 15 wherein the first table includes $2^8 \times 7$ data entries for each state number output and there are 3 state numbers.

17. The communication channel of claim 14 wherein the second decoder comprises a second look-up table configured to map the second portion of the plurality of data bits and the state number into the second decoded data output.

18. The communication channel of claim 17 wherein the second table includes at most $2^8 \times 10$ data entries for each state number output and there are 3 state number outputs.

19. The communication channel of claim 14 wherein the decoder and the second decoder include tables of codewords for the first and second decoded data outputs, the codewords selected to provide a desired minimum codeword energy.

20. The communication channel of claim 14 including a partial response maximum likelihood decoder coupled between the input element and the first and second decoders.

21. The communication channel of claim 14 wherein the first decoder comprises an algorithm responsively translating the first portion of bits into the state number output and the first decoded data output.

22. The communication channel of claim 14 wherein the second decoder comprises an algorithm responsively translating the state number output and the second portion of bits into the second decoded data output.

23. The communication channel of claim 14 wherein the medium comprises a storage medium and the input element comprises a head positioned proximate the medium.

24. The communication channel of claim 23 wherein the storage medium comprises a disc.

* * * * *